July 23, 1940.  E. COBURN  2,208,894
WEEDER
Filed July 5, 1938  2 Sheets-Sheet 1
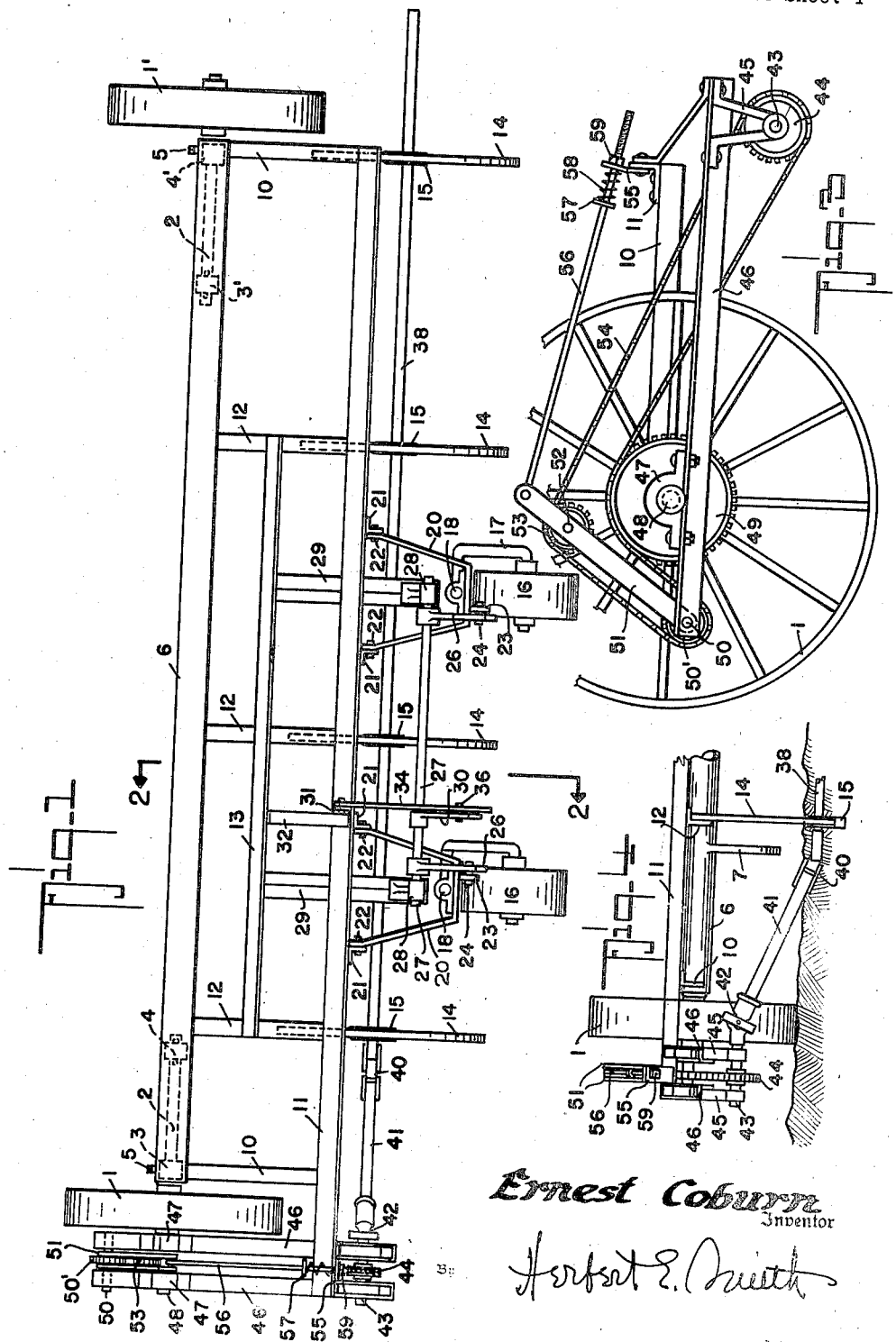
Ernest Coburn
Inventor
Herbert E. Smith
Attorney July 23, 1940.  E. COBURN  2,208,894
WEEDER
Filed July 5, 1938  2 Sheets-Sheet 2
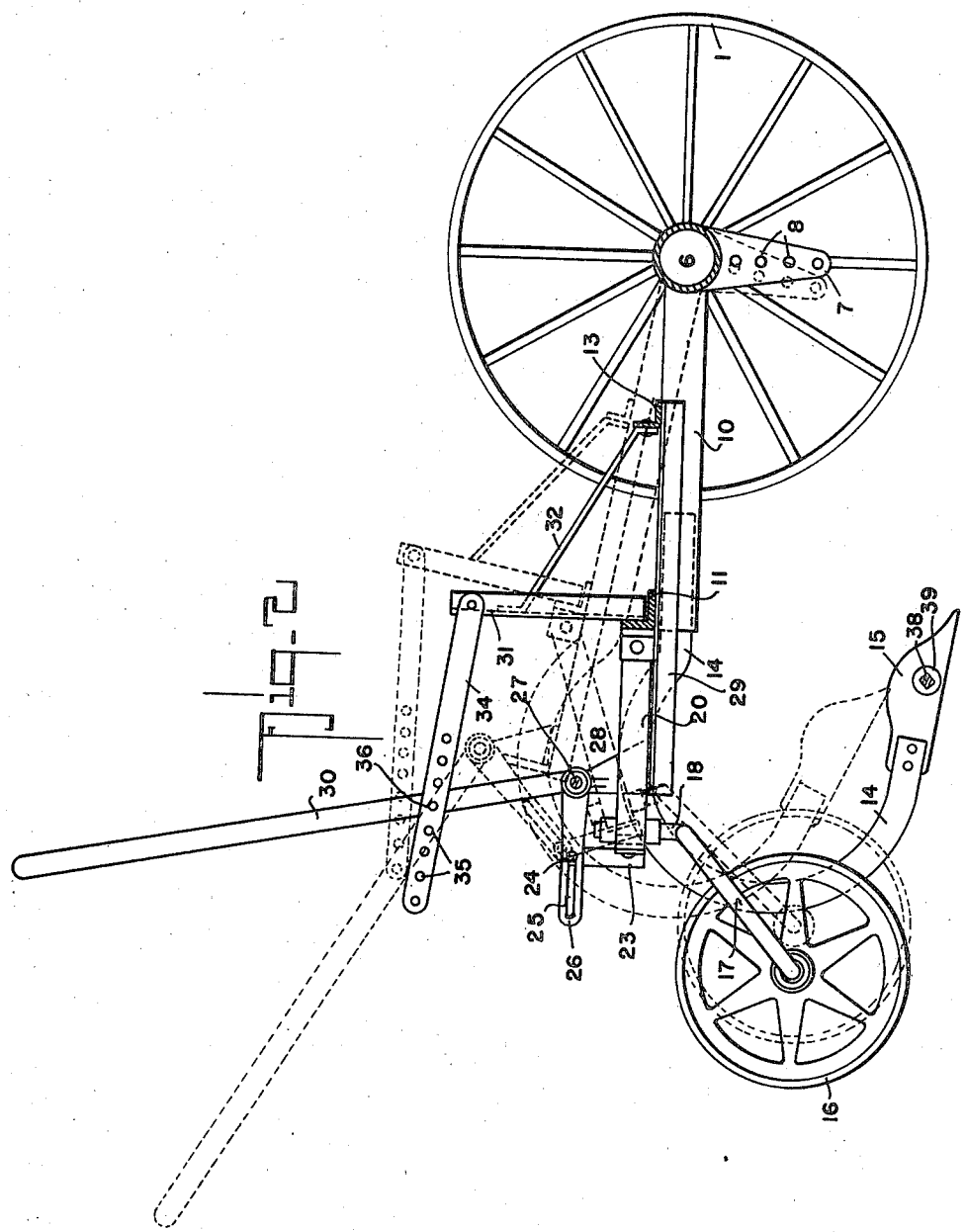
Ernest Coburn
Inventor
By Herbert E. Smith
Attorney Patented July 23, 1940

2,208,894

UNITED STATES PATENT OFFICE 2,208,894

WEEDER

Ernest Coburn, Spokane, Wash., assignor, by mesne assignments, to Walla Walla Iron Works, Inc., Walla Walla, Wash.

Application July 5, 1938, Serial No. 217,376

2 Claims. (Cl. 97—42)

My present invention relates to improvements in weeders and more particularly to weeders of the rotary rod traction operated type employing a rotating rod designed to rotate beneath the soil surface to remove weeds or other plants growing in the soil.

The rotary rod is generally of a polygonal shape in cross-section and is rotated in a direction counter-clockwise to the direction of the vehicle wheel movement.

The weeder also performs the function of forming a mulch on the ground surface which mulch is conducive to a retention of moisture by the soil.

The primary purpose of this invention is to provide a weeder in which substantially all of the weight of the main frame, the elevating frame, and the drive frame, is imposed or bears on the rotary rod to insure the operation of the rod at the desired depth below the ground surface.

In the propulsion of the implement, I have also provided draft means for the weeder located in such a manner that the pull from the power means will tend to force the rotary rod lower into the soil, rather than to tend to elevate the rod.

In the accompanying drawings I have illustrated one complete example of the physical embodiment of my invention according to one mode I have thus far devised, but it will be understood that changes and alterations may be made in the exemplified structure within the scope of the invention as set forth in the appended claims.

Figure 1 is a top plan view of the weeder of my invention.

Figure 2 is a vertical, longitudinal, sectional view of the weeder taken along line 2—2 of Figure 1.

Figure 3 is an enlarged side elevation of the weeder looking to the right in Figure 1, and showing the driving mechanism.

Figure 4 is a partial rear elevation showing the power transmitting mechanism for the rotary rod.

Referring now to the drawings, the supporting wheels of the weeder are illustrated as 1 and 1'. If desired, the wheel 1 may be provided with cleats or other suitable means to increase traction and insure the rotation of the wheel as it passes over the ground. The wheels 1 and 1' have stub shafts 2 and 2, which are journaled in duplicate bearings 3 and 4 and 3' and 4', and set screws as 5, 5 are employed to fix the respective bearings 3 and 4', to maintain the wheels in properly adjusted positions. The shafts and their bearings are inserted into the opposite ends of the tubular axle 6, and the set screws 5 are threaded through a wall of the tubular axle for engagement with the respective bearings.

The implement may be propelled by a tractor or other suitable means coupled at the front thereof and the axle 6 is provided with two integral depending hitches or draft arms 7 each having a series of holes 8 therein in order that power implements having couplings at different heights may be accommodated.

Extending rearwardly from the tubular axle 6 I employ a pair of rigid side frame members 10, and rigidly connecting these side frame members is the rear cross bar 11, and intermediate frame members 12 strengthen and brace the rectangular frame structure and support the short central cross bar 13 of the main frame of the implement.

Extending downwardly and rearwardly from each of the intermediate frame members 12 I mount a goose neck arm 14 of the usual type having shoes 15 at their lower ends which are adapted to penetrate the soil surface.

The main frame is thus pivotally supported by its tubular axle and the bearings 3—4 and 3'—4' on the concentric stud-shafts 2—2 so that a forward pull on the draft arms 7—7 depending from the tubular axle will tend to swing the main frame downwardly at the rear of the axle. Thus while the implement is being towed by a tractor, the pull of the tractor on the draft arms 7 (in addition to the weight of the frames) depresses the rotary rod 38 beneath the surface of the soil as indicated in Figures 2 and 4.

To provide rear supports for the weeder, I employ a pair of caster wheels 16—16 journaled on the U-shaped yokes 17—17 each having a vertical pin 18—18 journaled in a bracket frame 20—20 pivotally secured at its ends on the frame member 11, by means of an angle bracket 21—21 and bolts 22—22.

On the bracket frame 20—20 I rigidly secure vertical arms 23—23 having pins 24—24 slidable in slots 25—25 of the lever arms 26—26.

The two elevating arms 26—26 are rigidly secured on the elevating shaft 27 which is pivotally mounted in the journals 28—28 on the rigid supporting arms 29—29 of the main frame extending rearwardly from the central frame member 13.

An operating lever 30 is secured in rigid manner with the shaft 27 for elevating the frame and the supported structure on pivots 22—22.

In order that the frame and supported structure may be maintained in adjusted position, I utilize an upright angle iron standard 31 on the frame member 11 and this standard is braced as by the strap 32 rigidly attached to the standard at one end, and at its other end to the cross member 13. An adjustable link 34 is pivotally mounted in the arm 31 and provided with a series of holes 35, one of said series of holes being adapted for positioning on the pin 36 of the operating lever 30 to maintain the frame in position.

The transversely extending rotary rod 38 is mounted in shoes 15 by means of journals 39 rotatably secured in the said shoes. At its right end in Figure 1, the rod extends well beyond the wheel 1' in order that a path of maximum width may be cultivated.

At its left end in Figures 1 and 4, the rod is provided with, and connected to, a universal joint 40 of any suitable construction, and the universal joint in turn, is attached to a connecting rod 41. The rod 41 is connected with another universal joint 42 which in turn has a driving connection with the shaft 43.

This shaft 43 carries a sprocket wheel 44 and is journaled in supporting brackets 45—45 depending from one end of the parallel arms 46—46. Near the other ends thereof these parallel arms are secured to a pair of brackets 47—47 mounted on an extension shaft 48 of the shaft 2 and alined with the tubular axle 6. A driving sprocket 49 rigid with the shaft 48 is mounted intermediate the brackets 47—47 and the opposite ends of the parallel arms 46—46 carry a shaft 50 journaled therein. The sprocket wheel 50' is mounted on the latter shaft. Also journaled on this shaft 50, I employ a pair of pivoted tension arms 51—51 having mounted therebetween adjacent their upper or free ends, a shaft 52 and a sprocket wheel 53.

The sprocket chain 54 engages the wheels 44, 49, 50' and 53 and thus provides the means of power transmission between the ground engaging wheel 1, and the rotary rod 38.

Between the free ends of the tension arms 51—51 and a clip 55 secured to the rear end of arm 10 I mount a tension rod 56 having a spacing collar 57 rigid therewith. Between the collar 57 and the clip 55 is interposed a coiled spring 58, and exterior of the clip 55, the threaded end of the rod 56 is provided with an adjusting nut 59. The tension rod, when properly adjusted as by the relative position of the nut 59, provides for the maintainance of the sprocket chain in a taut condition due to the pressure exerted against the tension arms 51—51 and the sprocket wheel 53 carried thereby.

In operation, the tractor or other source of motive power is properly connected to the hitch 7, employing one of the holes 8.

When the depth of the weeder operation has been determined the lever 30 is detached from the arm 34 and is permitted to be elevated by the weight of the frame, and the frame and the depending shoes and the rotary rod. When the position has been reached at which the desired depth of cultivation will be carried out, the lever 30 through its pin 37 is secured to arm 34 by means of one of the holes 35 therein.

The caster wheel yokes, being pivotally secured to the frame member 11 at 22—22 are elevated or lowered with the frame, and the caster wheels, of course, remain in contact with the ground.

The tension of the sprocket chain is then adjusted to the desired degree by operation of the nut 59 on the rod 56.

When the weeder is pulled forwardly, the wheel 1 drives the sprocket 49 and the chain 54. The wheel 44 is driven in a direction counter-clockwise to the direction of the movement of the wheel 1, and imparts the same directional movement to the connecting rod 41 and the weeder rod 38. The weeder rod thus moves in a direction counter-clockwise to that of the implement wheels.

Due to the fact that the main axle 6, is tubular, a minimum of weight is located forward of the weeder rod 38, and substantially all of the weight of the implement is carried by the weeder rod and the shoes. The caster wheels serve only to maintain the weeder rod from penetrating into the soil beyond the predetermined, desired depth.

It is therefore apparent that the forward movement of the implement will tend to lower the weeder rod and the shoes into the soil to the point permitted by the previous adjustment of the operating lever 30.

The location of the hitch 7 in its depending position below the tubular axle 6 is also of value in tending to lower the rod and shoes into the soil but it will be apparent that the primary cause of the proper functioning of the weeder and rod is the location and centralization of the supported weight to the rear of the axle 6, and on the weeder rod and shoes.

Having thus fully described my invention, what I claim as new and desire to secure by Letters Patent is:

1. In a rotary rod weeder, the combination with a pair of front traction wheels, a main frame having a concentric pivotal support on the wheels and extending rearwardly thereof, a rotary rod mounted at the rear of the main frame, and vehicle-actuated means for rotating said rod, of a pair of spaced yokes hinged at their front ends to the main frame at the rear of the front wheels and swiveled caster wheels mounted in said yokes, a rock-shaft journaled in bearings on the main frame, a pair of slotted arms mounted on and projecting rearwardly of the rock shaft, a pair of fulcrum brackets rigid with the yokes and having fulcrum pins co-acting with the slotted arms, an adjusting lever rigid with the rock shaft, a post on the main frame, a link pivoted on the post, and detachable means for fastening the free end of said link to the lever.

2. In a rotary rod weeder, the combination with a main frame having a front pivotal support, and a rotary rod mounted on the rear of the main frame, of an adjusting frame, a pivotal support on the main frame, and caster wheels swiveled in said frame, lever-operated mechanism having a fulcrum connection with the main frame at the rear of the pivotal support of the adjusting frame, an adjustable pivotal connection between the lever-operated mechanism and the adjusting frame located back of the fulcrum connection, and means for holding the lever-operated mechanism in adjusted position.

ERNEST COBURN.